US006911498B2

(12) United States Patent
Matsumoto et al.

(10) Patent No.: US 6,911,498 B2
(45) Date of Patent: Jun. 28, 2005

(54) COMPOSITION FOR VULCANIZING FLUORORUBBERS AND FLUORORUBBER MOLDINGS

(75) Inventors: Koji Matsumoto, Settsu (JP); Yoshihiro Shirai, Settsu (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/403,224

(22) PCT Filed: Apr. 14, 1998

(86) PCT No.: PCT/JP98/01692

§ 371 (c)(1),
(2), (4) Date: Oct. 15, 1999

(87) PCT Pub. No.: WO98/46667

PCT Pub. Date: Oct. 22, 1998

(65) Prior Publication Data

US 2003/0149184 A1 Aug. 7, 2003

(30) Foreign Application Priority Data

Apr. 15, 1997 (JP) ............................................ 9/097207

(51) Int. Cl.$^{7}$ .................................................. C08K 5/14
(52) U.S. Cl. ........................ 525/263; 525/265; 525/276
(58) Field of Search ................................ 525/263, 265, 525/276

(56) References Cited

U.S. PATENT DOCUMENTS 4,530,972 A * 7/1985 Tatemoto et al. ........... 525/276
4,910,260 A * 3/1990 Wachi et al. ............... 525/260
5,049,622 A * 9/1991 Abe ........................... 525/276
5,214,106 A * 5/1993 Carlson et al. ............. 525/276
5,399,623 A * 3/1995 Ueta et al. .................. 525/276
5,902,857 A * 5/1999 Wlassics et al. ............ 525/276
5,948,868 A * 9/1999 Albano et al. .............. 525/276

FOREIGN PATENT DOCUMENTS

WO 95-15995 * 6/1995

* cited by examiner

*Primary Examiner*—Judy M. Reddick
(74) *Attorney, Agent, or Firm*—Birch, Stewart, Kolasch & Birch, LLP

(57) ABSTRACT

A curing composition of a fluororubber comprising a fluororubber which is curable with an organic peroxide, for example, an iodine-containing fluororubber, a polyfunctional unsaturated compound, and an organic peroxide, for example, dicumyl peroxide, in which the total amount of acetone and tert.-butanol contained in the decomposed products of the organic peroxide, which are generated at a curing temperature, is 2 moles or less per one mole of the decomposed products.

8 Claims, No Drawings

COMPOSITION FOR VULCANIZING FLUORORUBBERS AND FLUORORUBBER MOLDINGS

This application is the national phase under 35 U.S.C. § 371 of PCT International Application No. PCT/JP98/01692 which has an International filing date of Apr. 14, 1998, which designated the United States of America.

FIELD OF THE INVENTION

The present invention relates to a curing composition of a fluororubber, and a molded article of a fluororubber. In particular, the present invention relates to a curable composition of a fluororubber, which provides a molded article having practically sufficient properties, for example, heat-resistance, without secondary curing, and a molded article of a fluororubber which is produced by molding and curing such a composition.

BACKGROUND ART

Fluororubbers are used as industrial materials in a wide variety of technical fields, since they have much better heat-resistance, oil-resistance, solvent-resistance, chemical-resistance, etc. than general-purpose rubbers.

Fluororubbers are often used under severe conditions such as a temperature of 200° C. by making use of their particularly good heat-resistance. However, for achieving heat-resistance under such severe conditions, it is inevitable to mold the curable composition of fluororubbers, subjecting the molded article to primary curing and then subjecting the cured article to secondary curing to complete crosslinking and to release gasses generated in the course of crosslinking.

SUMMARY OF THE INVENTION

However, a curing composition comprising a fluororubber, which provides a molded article having practically sufficient properties only by primary curing without secondary curing, has been sought, since the secondary curing requires a large amount of heat energy and additional work.

Thus, one object of the present invention is to provide such a curing composition of a fluororubber.

Accordingly, the present invention provides a curing composition of a fluororubber comprising a fluororubber which is curable with an organic peroxide, a polyfunctional unsaturated compound, and an organic peroxide, wherein the total amount of acetone and tert.-butanol contained in the decomposed products of said organic peroxide, which are generated at a curing temperature, is 2 moles or less per one mole of the decomposed products.

DETAILED DESCRIPTION OF THE INVENTION

Fluororubbers contained in the composition of the present invention may be any known fluororubbers that can be cured with organic peroxides. Preferred examples of such fluororubbers are as follows:

Vinylidene fluoride base fluororubbers:

VdF-HFP copolymers, VdF-HFP-TFE copolymers, VdF-PFP copolymers, VdF-PFP-TFE copolymers, VdF-PEMVE-TFE copolymers, VdF-PFMVE-HFP copolymers, VdF-CTFE copolymers, VdF-HFP-E copolymers, VdF-HFP-TFE-E copolymers The abbreviations used in the above have the following meanings:

VdF: Vinylidene fluoride

HFP: Hexafluoropropylene

TFE: Tetrafluoroethylene

PFP: Pentafluoroprpylene

PFMVE: Perfluoro(methyl vinyl ether)

CTFE: Chlorotrifluoroethylene

E: Ethylene

Propylene-tetrafluoroethylene fluororubbers:

Propylene (30–60 mole %)-tetrafluoroethylene (40–70 mole %) copolymers

Such copolymers may comprise 0 to 20 mole % of one or more other monomers which can be copolymerizable therewith.

Tetrafluoroethylene-perfluoro(alkyl vinyl ether) copolymers:

Tetrafluoroethylene (40–85 mole %)-perfluoro(alkyl vinyl ether) (15–60 mole %) copolymers Other fluororubbers:

Fluorosilicone rubbers, polyfluoroalkoxyphosphazene rubbers.

There are various methods to make fluororubbers curable with organic peroxides.

For example, fluororubbers are prepared by polymerizing monomers in the presence of iodine-containing compounds such as $CH_2I_2$, or iodine/bromine-containing compounds such as $CH_2IBr$, by copolymerizing diene compounds such as $CF_2{=}CF{-}CF{=}CF_2$, or by heat treating prepared polymer to introduce double bonds in molecules.

Polyfunctional unsaturated compounds contained in the composition of the present invention may be ones that are known as curing aids. Preferred examples of polyfunctional unsaturated compounds are triallyl isocyanurate, trimethallyl isocyanurate, triallyl cyanurate, triacryl formal, triallyl trimellitate, etc.

The amount of polyfunctional unsaturated compounds is from 0.1 to 10 wt. parts, preferably from 1 to 5 wt. parts, per 100 wt. parts of the fluororubbers.

Organic peroxides used according to the present invention are such compounds that generate decomposed products containing acetone and tert.-butanol in a total amount of 2 moles or less per one mole of the decomposed products, when they are decomposed under a curing temperature condition.

Table 1 summarizes the compositions of low-boiling decomposed products of several known organic peroxides under curing temperature conditions.

TABLE 1

| Organic peroxide | Low-boiling decomposed products (mole/mole) | | | |
|---|---|---|---|---|
| | Methane | Ethane | Acetone | tert.-butanol |
| 1 | 0.56 | 0.37 | 2.14 | 1.30 |
| 2 | 1.15 | 0 | 0 | 0 |
| 3 | 0.62 | 0 | 0.32 | 0.7 |
| 4 | 0.53 | 0 | 0.56 | 1.14 |

Notes 1: 2,5-Dimethyl-2,5-bis (tert.-butylperoxy) hexane (Perhexa 25B)
2: Dicumyl peroxide (Percumyl D)
3: tert.-Butylcumyl peroxide (Perbutyl C)
4: di-tert.-Butyl peroxide (Perbutyl D)

Among the organic peroxides which generate decomposed products containing 2 mole/mole or less of acetone and tert.-butanol in total, dicumyl peroxide is preferable, since it generates neither acetone nor tert.-butanol.

The amount of organic peroxides is from 0.3 to 1.2 wt. parts, preferably from 0.4 to 1.0 wt. parts, per 100 wt. parts of fluororubbers. When the amount of organic peroxides exceeds 1.2 wt. parts, the weight change in use increases, which may cause some practical problems.

The curing composition of fluororubbers according to the present invention may optionally contain conventional additives which are compounded in fluororubbers, for example, fillers, processing aids, plasticizers, colorants, etc.

The curing composition of fluororubbers according to the present invention can provide cured molded articles, which have practically sufficient properties and in which the contribution of secondary curing to a compression set (which will be defined below) is 30% or less, only by primary curing which is applied to the conventional curing compositions of fluororubbers.

Curing conditions may be the same as those used to cure the conventional curing compositions of fluororubbers. For example, the compositions are cured for 0.1 to 1 hours at a curing temperature in a range between 150 and 190° C., under a curing pressure in a range between 1 and 10 Pa.

EXAMPLES

Comparative Example 1

Medium thermal carbon (MT-C) (20 wt. parts), triallyl isocyanurate (TAIC-M60, 60% diluted product of triallyl isocyanurate, manufactured by NIPPON KASEI KABUSHIKIKAISHA) (6.7 wt. parts) and Perhexa 25B (manufactured by NOF Corporation) (0.5 wt. part) were compounded in DAIEL G-912 (an iodine-containing fluororubber manufactured by DAIKIN INDUSTRIES, LTD.) (100 wt. parts), and well kneaded on open rolls to obtain a testing compound.

The obtained compound was molded, and subjected to primary curing at 160° C. for 10 minutes, and secondary curing at 180° C. for 4 hours to obtain a sheet (120 mm×150 mm×2 mm) for the measurement of physical properties, and a P-24 O-ring for the measurement of a compression set.

With a molded product which had been primarily cured and one which had been primarily and secondarily cured, the following measurements were carried out.

$M_{100}$ (100% modulus), $T_S$ (tensile strength at break) and $E_B$ (elongation at break) of a sheet were measured according to JIS K6301, and Hs (hardness) of a sheet was measured according to JIS K6253, Type A.

ΔW was a weight change rate expressed by the formula:

[(weight of secondarily cured product−weight of primarily cured product)/(weight of primarily cured product)]×100%

CS (compression set) was measured using a P-24 O-ring, which is defined by JIS B2401, under the conditions of 200° C., 70 hours and 25% compression, according to JIS K6301.

The contribution of secondary curing to a compression set was evaluated by the formula:

$$[(CS_1-CS_2)/CS_2]\times 100\%$$

in which $CS_1$ is the compression set of a primarily cured product, and $CS_2$ is the compression set of a secondarily cured product.

Comparative Examples 2 and 3

A composition was prepared, a sheet and an O-ring were molded and then their properties were measured by the same methods as in Comparative Example 1 except that the amount of Perhexa 25B was changed to 1.0 wt. part or 1.5 wt. parts.

Comparative Examples 4 and 5

A composition was prepared, a sheet and an O-ring were molded and then their properties were measured by the same methods as in Comparative Example 1 except that 0.25 wt. part or 1.5 wt. parts of Percumyl D (manufactured by NOF Corporation) was used in place of Perhexa 25B.

Comparative Example 6

A composition was prepared, a sheet and an O-ring were molded and then their properties were measured by the same methods as in Comparative Example 1 except that DAIEL G-902 (an iodine-containing fluororubber manufactured by DAIKIN INDUSTRIES, LTD.) was used as a fluororubber.

Comparative Example 7

A composition was prepared, a sheet and an O-ring were molded and then their properties were measured by the same methods as in Comparative Example 1 except that DAIEL G-902 (an iodine-containing fluororubber manufactured by DAIKIN INDUSTRIES, LTD.) was used as a fluororubber, and the amount of Perhexa 25B was changed to 1.5 wt. parts.

Examples 1 and 2

A composition was prepared, a sheet and an O-ring were molded and then their properties were measured by the same methods as in Comparative Example 1 except that 0.5 wt. part or 1.0 wt. part of Percumyl D was used in place of Perhexa 25B.

Example 3

A composition was prepared, a sheet and an O-ring were molded and then their properties were measured by the same methods as in Comparative Example 1 except that 1.0 wt. part of Perbutyl C was used in place of Perhexa 25B.

Example 4

A composition was prepared, a sheet and an O-ring were molded and then their properties were measured by the same methods as in Comparative Example 1 except that 1.0 wt. part of Perbutyl D was used in place of Perhexa 25B.

Example 5

A composition was prepared, a sheet and an O-ring were molded and then their properties were measured by the same methods as in Comparative Example 1 except that DAIEL G-902 (an iodine-containing fluororubber manufactured by DAIKIN INDUSTRIES, LTD.) was used as a fluororubber, and 0.5 wt. part of Percumyl D was used in place of Perhexa 25B.

The results are shown in Table 2.

TABLE 2

| | Comparative Example No. | | | | | | | Example No. | | | | |
|---|---|---|---|---|---|---|---|---|---|---|---|---|
| | 1 | 2 | 3 | 4 | 5 | 6 | 7 | 1 | 2 | 3 | 4 | 5 |
| Composition | | | | | | | | | | | | |
| DAIEL G-912 | 100 | 100 | 100 | 100 | 100 | — | — | 100 | 100 | 100 | 100 | — |
| DAIEL G-902 | — | — | — | — | — | 100 | 100 | — | — | — | — | 100 |
| MT-C | 20 | 20 | 20 | 20 | 20 | 20 | 20 | 20 | 20 | 20 | 20 | 20 |
| TAIC M60 | 6.7 | 6.7 | 6.7 | 6.7 | 6.7 | 6.7 | 6.7 | 6.7 | 6.7 | 6.7 | 6.7 | 6.7 |
| Perhexa 25B | 0.5 | 1.0 | 1.5 | — | — | 0.5 | 1.5 | — | — | — | — | — |
| Percumyl D | — | — | — | 0.25 | 1.5 | — | — | 0.5 | 1.0 | — | — | 0.5 |
| Perbutyl C | — | — | — | — | — | — | — | — | — | 1.0 | — | — |
| Perbutyl D | — | — | — | — | — | — | — | — | — | — | 1.0 | — |
| Mechanical properties aft. primary curing (160° C. × 10 min.) | | | | | | | | | | | | |
| $M_{100}$ | 112 | 119 | 114 | 62 | 115 | 37 | 40 | 119 | 100 | 128 | 131 | 39 |
| $T_B$ | 205 | 216 | 186 | 166 | 195 | 180 | 206 | 211 | 195 | 225 | 227 | 184 |
| $E_B$ | 175 | 170 | 170 | 240 | 170 | 350 | 310 | 175 | 170 | 175 | 165 | 320 |
| Hs | 74 | 75 | 73 | 73 | 73 | 72 | 71 | 75 | 74 | 74 | 75 | 72 |
| CS (200° C. × 70 hrs) | 29.5 | 24.9 | 25.0 | 37.0 | 24.0 | 27 | 30.0 | 21.8 | 21.2 | 23.9 | 23.3 | 23 |
| Mechanical properties aft. secondary curing (180° × 4 hrs.) | | | | | | | | | | | | |
| $M_{100}$ | 152 | 147 | 154 | 89 | 151 | 46 | 51 | 148 | 135 | 164 | 153 | 49 |
| $T_B$ | 273 | 252 | 284 | 228 | 248 | 230 | 254 | 253 | 264 | 275 | 276 | 221 |
| $E_B$ | 175 | 165 | 160 | 210 | 160 | 300 | 280 | 165 | 160 | 165 | 165 | 300 |
| Hs | 77 | 77 | 77 | 74 | 77 | 72 | 74 | 77 | 76 | 77 | 77 | 72 |
| CS (200° C. × 70 hrs) | 20.4 | 17.3 | 17.1 | 18.9 | 17.3 | 23.0 | 28.0 | 19.0 | 16.9 | 19.1 | 18.0 | 21 |
| ΔW (%) | 0.44 | 0.85 | 1.20 | 0.42 | 1.13 | | | 0.51 | 0.42 | 0.76 | 0.37 | |
| $[(CS_1–CS_2)/CS_2)] \times 100$ (%) | 44.6 | 43.9 | 46.2 | 95.8 | 38.7 | 17.4 | 7.1 | 14.7 | 25.4 | 25.1 | 29.4 | 9.5 |

As can be understood from the results of Examples 1–5, the compositions of the present inventions provide O-rings having a small compression set (200° C.×70 hours) only by primary curing.

As can be seen from the results of Comparative Example 4, the use of dicumyl peroxide in an amount of 0.25 wt. part deteriorates a compression set, since the curing does not sufficiently proceed. The results of Comparative Example 5 indicates that the use of dicumyl peroxide in an amount of 1.5 wt. parts significantly increases the weight change ΔW (%).

Molded articles, which are produced by curing the compositions of the present invention, have less contribution of secondary curing to a compression set, and achieve a smaller compression set than those produced from conventional compositions after the primary curing, when the same fluororubbers are used. Thus, it is understood that molded articles produced from the compositions of the present invention-have good practical usefulness without being secondarily cured.

What is claimed is:

1. A process for producing a cured molded article consisting essentially of the step of:

primarily curing a fluororubber composition comprising 100 parts by weight of a fluororubber which is curable with an organic peroxide, 0.1 to 10 parts by weight of a polyfunctional unsaturated compound, and 0.5 to 1.0 parts by weight of an organic peroxide selected from the group consisting of dicumyl peroxide, tert.-butylcumyl peroxide and di-tert.-butyl peroxide, at a temperature of 150 to 190° C. for 0.1 to 1 hour, wherein the total amount of acetone and tert.-butanol contained in the decomposed products of one mole of said organic peroxide, which are generated at a curing temperature, is 2 moles or less.

2. A process according to claim 1, wherein said cured molded article is an O-ring.

3. The process according to claim 1, wherein the organic peroxide is dicumyl peroxide.

4. A process for producing a cured molded article consisting essentially of the step of:

primarily curing a fluororubber composition comprising 100 parts by weight of a fluororubber which is curable with dicumyl peroxide, 0.1 to 10 parts by weight of a polyfunctional unsaturated compound, and 0.5 to 1.0 parts by weight of dicumyl peroxide at a temperature of 150 to 190° C. for 0.1 to 1 hour, wherein the total amount of acetone and tert.-butanol contained in the decomposed products of one mole of the dicumyl peroxide, which are generated at a curing temperature, is 2 moles or less.

5. A process according to claim 4, wherein said cured molded article is an O-ring.

6. A process for producing a cured molded article comprising the step of:

primarily curing a fluororubber composition comprising 100 parts by weight of a fluororubber which is curable with an organic peroxide, 0.1 to 10 parts by weight of a polyfunctional unsaturated compound, and 0.5 to 1.0 parts by weight of an organic peroxide selected from the group consisting of dicumyl peroxide, tert.- butylcumyl peroxide and di-tert.-butyl peroxide, at a temperature of 150 to 190° C. for 0.1 to 1 hour, wherein the total amount of acetone and tert.-butanol contained in the decomposed products of one mole of said organic peroxide, which are generated at a curing temperature, is 2 moles or less.

7. A process according to claim 6, wherein said cured molded article is an O-ring.

8. The process according to claim 6, wherein the organic peroxide is dicumyl peroxide.

* * * * *